Figure 1:
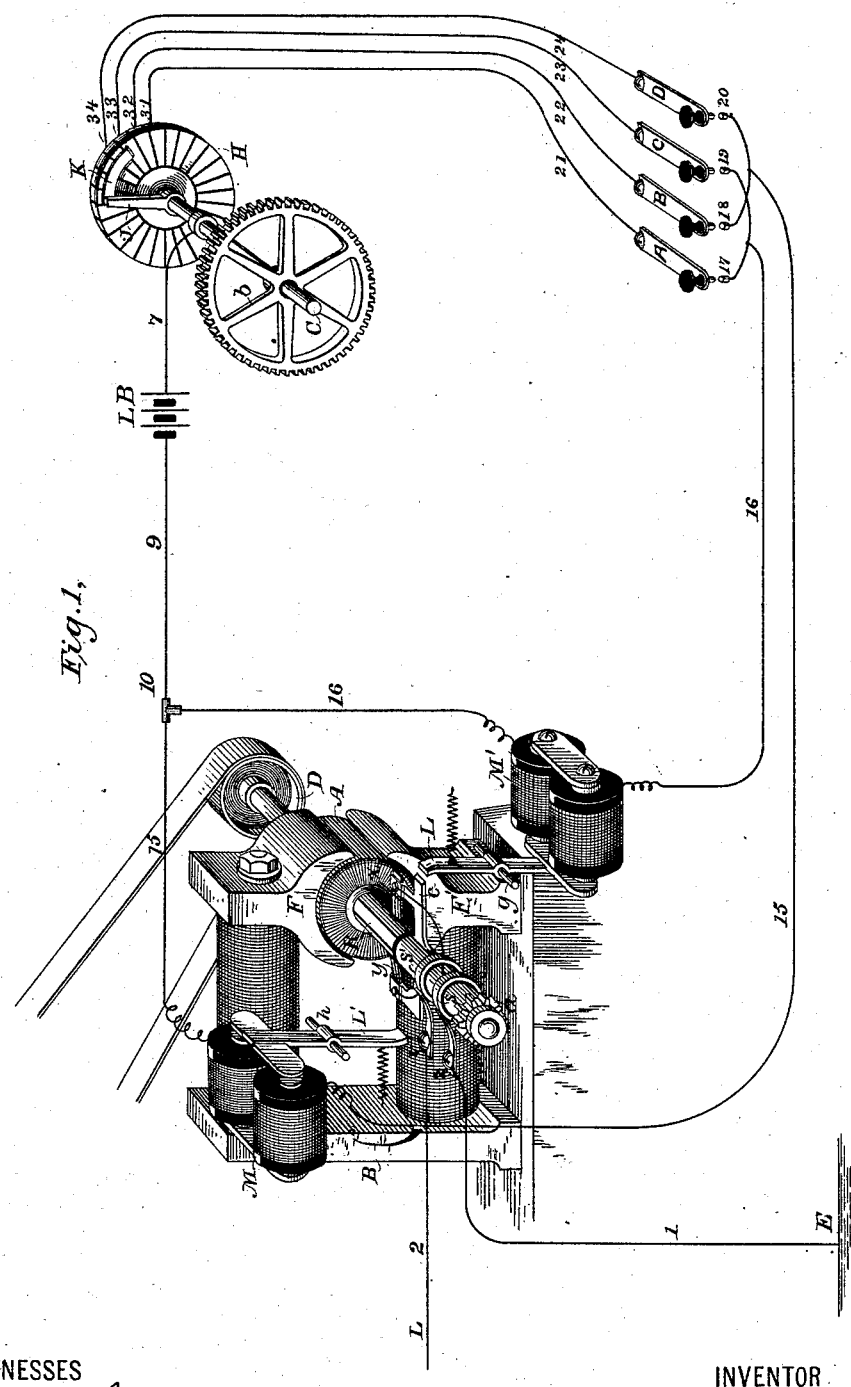

(No Model.)  2 Sheets—Sheet 1.

S. D. FIELD.
DYNAMO TELEGRAPHY.

No. 282,295. Patented July 31, 1883.

WITNESSES
Wm A. Skinkle
Jos. S. Latimer

INVENTOR
Stephen D. Field,
By his Attorney
C. L. Buckingham (No Model.) 2 Sheets—Sheet 2.

S. D. FIELD.
DYNAMO TELEGRAPHY.

No. 282,295. Patented July 31, 1883.

WITNESSES
Wm A. Skinkle
Jos. S. Latimer

INVENTOR
Stephen D. Field,
By his Attorney
C. L. Buckingham

UNITED STATES PATENT OFFICE.

STEPHEN D. FIELD, OF NEW YORK, N. Y., ASSIGNOR TO THE WESTERN UNION TELEGRAPH COMPANY, OF SAME PLACE.

DYNAMO-TELEGRAPHY.

SPECIFICATION forming part of Letters Patent No. 282,295, dated July 31, 1883.

Application filed August 5, 1882. (No model.)

*To all whom it may concern:*

Be it known that I, STEPHEN D. FIELD, a citizen of the United States, and a resident of the city, county, and State of New York, have invented a new and useful improvement in commutators and other devices for dynamo-electric machines, for the purpose of adapting said machines to furnish either a pulsatory current for a printing-telegraph line to move the type-wheels step by step, or a continuous current of either polarity to actuate the printing mechanism of receiving-instruments upon the same telegraph-line, of which the following is a specification.

To this end I employ a dynamo-electric machine having an armature whose section-bobbins are all electrically connected together, and whose wires joining adjacent armature-sections are connected, respectively, with insulated strips of the commutator. Instead of employing two stationary commutator-brushes, I use two commutator-brushes which are frictionally mounted upon the shaft of the dynamo-machine, and which normally rotate with said shaft; but which can be arrested at either of two points, which are a half-revolution apart when it is desired to transmit a signal. While the commutator-brushes are permitted to rotate with the armature pulsatory currents will be generated; but when the commutator-brushes are arrested so that their points rest upon commutator-strips which are connected with armature-bobbin sections in a line or plane, or nearly so, at right angles with the line joining the poles of the field-magnets a continuous current will be generated. In the course of one rotation of the armature, when the brushes are in a line at right angles joining the field-magnets, a maximum impulse of one polarity will be generated, and this maximum strength of current will decrease to zero at the end of one-fourth of a revolution—that is, when the commutator-brushes are in line with the field-magnets. At the end of one-fourth of a revolution, also, the polarity of current changes and increases to a maximum at the end of one-half of a revolution. The maximum strength of the reverse polarity decreases to zero at the end of three-fourths of a revolution, where the polarity of current generated is again reversed, and gradually increases when it rises to a maximum at the end of one revolution. Thus for each revolution of the armature negative and positive impulses are generated.

In connection with the dynamo-electric machine a local battery and sunflower arrangement and a series of transmitting-keys are provided, also two electro-magnetic stop arrangements for arresting the rotating commutator. Upon depressing a transmitting-key, the sunflower-arm, when rotating into contact with that sunflower section connected with the key depressed, closes the local circuit and magnetizes one of the commutator-arresters, whereupon the pulsatory currents upon the main line will be succeeded by a continuous current of the same polarity as that of the last pulsation sent.

I will now explain my invention by reference to the accompanying drawings.

Figure 4:
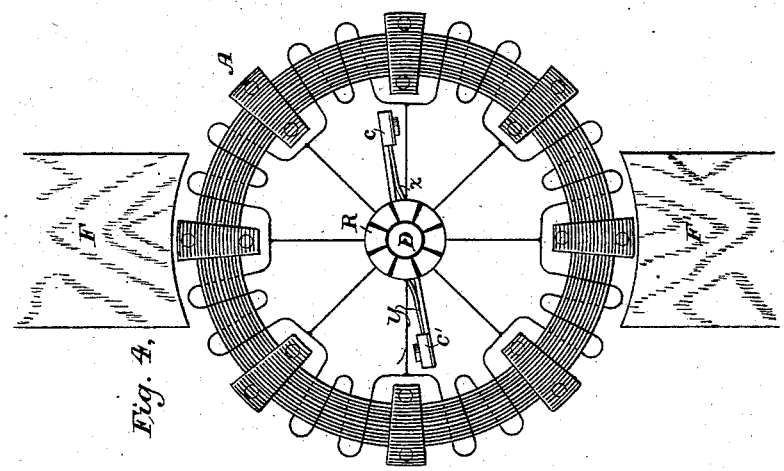
Figure 3:
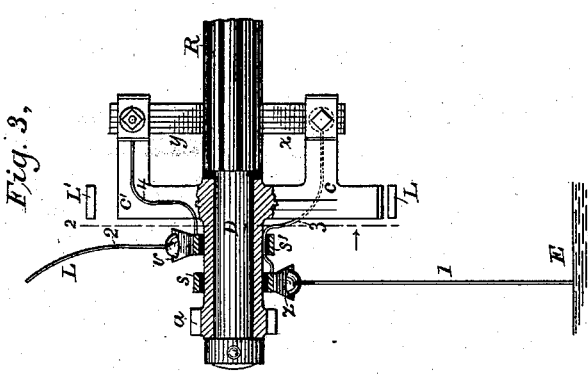
Figure 2:
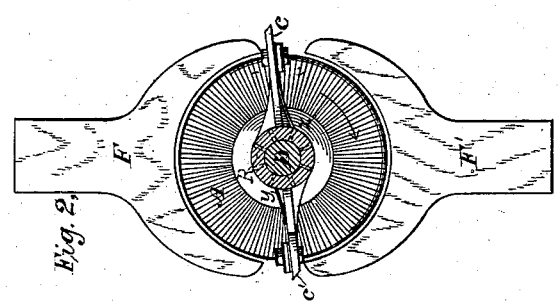

Figure 1 represents a view of my dynamo-electric machine provided with commutator-arresters. Fig. 2 represents an end view of the dynamo-electric machine and the rotating commutator. Fig. 3 represents the rotating commutator and arresting-arms. Fig. 4 represents an armature and the method of its winding for the purpose herein required.

A is the armature; F F', the field-magnets, and B the base of the dynamo-electric machine. The armature A is mounted upon shaft D, which is provided with a cylindrical series of insulated metallic strips, R, forming the commutator. Also, upon shaft D is frictionally mounted a pinion, $a$, to which are rigidly fixed arresting-arms $c\ c'$ and the commutator-brushes $y\ x$. Shaft D is also provided with two metallic rings, $s\ s'$, which are rigidly fixed, respectively, with the rotating commutator-brushes, against which rest two conducting-springs, $z\ v$, and which are connected, respectively, with the earth and the main line. The circuit from earth is completed through wire 1, conducting-spring $z$, insulated metallic ring $s$, wire 3 to the commutator-brush $x$, through the coils of the armature, back to commutator-brush $y$, thence to insulated metallic ring $s'$, to conducting-spring $v$, and thence to line. $s$ and $s'$, being fixed to the rotating commutator-brushes, are rotated and arrested therewith.

M and M' are electro-magnets, whose magnetizing-coils are in branches 15 and 16 of local battery L B, whose circuit is completed through the sunflower apparatus upon depressing any one of the transmitting-keys A B C D. Shaft C is shown somewhat removed from the dynamo-machine, though it is so arranged that spur-wheel $b$ meshes with driving-pinion $a$. Branch 15 is electrically connected with one of two alternate series of anvils of the transmitting-key, while branch 16 is connected with the other alternate series. Upon depressing any key of one alternate series, the sunflower-arm will be arrested in contact with a corresponding section of one alternate series of sunflower-sections, while if any transmitting-key of the other alternate series is depressed, the sunflower-arm will be arrested upon a corresponding section of a second alternate series of sunflower-sections. The depression of a transmitting-key closes one of two breaks in the local circuit, and upon rotation of the sunflower-arm, and after the conducting-spring K comes in contact with the sunflower-section connected with the key depressed, the local circuit thus established causes one of the arresting electro-magnets M M' to arrest the further rotation of the commutator-brushes. The arresting of the rotating commutator-brushes, which I term a "rotating commutator," it being geared with spur-wheel $d$, also arrests the further rotation of sunflower-arm J as long as the key remains depressed. When the transmitting-key is released, the revolving commutator resumes its rotation and the sunflower-arm continues to revolve.

As shown in Fig. 1, branch 15 is electrically connected with anvils 18 and 20 of keys B and D, and the keys B and D are connected with their respective sunflower-sections 32 and 34 by wires 22 and 24. In the same manner branch 16 is connected with the anvils 17 and 19 of keys A and C, which are connected to their respective sunflower-sections 31 and 33 by the wires 21 and 23. Therefore if key A be depressed, the rotating arm J will be arrested when spring $k$ arrives at sunflower-section 31, wherefore the local circuit will be completed through branch 16, and the magnetizing-coils of M', and the armature-lever L, which is pivoted at $g$, will be attracted into position to arrest the rotating commutator-brush. In the same manner upon depressing key B, the sunflower-arm J will be arrested when spring K comes in contact with sunflower-section 32, whereupon the rotating commutator will be arrested by armature-lever L', which is pivoted at $h$.

As a positive pulsation is generated during one half revolution of the armature, and a negative pulsation is generated during the second half of the same rotation, and as the type-wheels of the printing-instrument upon the line are moved a step at a time both for positive and negative pulsations, and as it is necessary that the type-wheels of the printing-magnet shall be arrested at the end of each pulsation, it is necessary that the rotating commutator be provided with means for causing its arrest at each semi-revolution. I have shown two electro-magnets and two arms carrying, respectively, the rotating brushes of the machine. In order that said brushes may be arrested in either of two diametrically-opposite positions, that arm carrying the brush $x$ is provided with a radial projection, $c$, which will be caught by either arm L or L', according as a circuit is completed through magnet M' or M.

In case of an armature of a dynamo-machine substantially as herein described and such as is shown in Figs. 1 and 4, a positive current will be derived from brush $y$ when $x$ and $y$ are in the position shown in Fig. 1, while if the commutator-brushes are given a half-revolution—that is, if the position of brush $x$ be given that of brush $y$ and brush $y$ be given that of brush $x$—a negative current will be derived from brush $y$. Thus, if brushes $x$ and $y$ are connected by wires 3 and 4 with their respective insulated metallic rings $s$ and $s'$, positive or negative currents will be established through wire 2 and the line, according to the position of the commutator-brushes $x$ and $y$. If the commutator-brushes be moved from the position shown in Fig. 1 in either direction ninety degrees, no current will be derived from said brushes.

Since a positive pulsation is generated upon one half of a revolution of the armature and a negative pulsation is generated upon the other half of the same revolution, and as the armature may be arrested upon each half-rotation, it is obvious that either a positive or negative pulsation may be prolonged into a continuous current of either polarity. Thus, as the type-wheels of a series of instruments upon the main line are moved step by step by positive and negative pulsations, the type-wheel may be arrested at the end of any pulsation of either polarity, and that pulsation may be prolonged into a continuous current to effect printing.

Fig. 4 represents a Gramme armature, consisting of a circular magnetic ring, around which is wound in a serpentine form a continuous coil of wire. The wire upon the armature, according to the well-known method of winding, is arranged in sections, and the termination of one section is connected with the beginning of the succeeding one, and so on around the whole armature, and each wire connecting the termination of one section with the beginning of the next is connected with an insulated metallic strip of the commutator. Thus there are as many commutator-strips as there are bobbin-sections upon the armature, though the number of bobbin-sections may be a multiple of the number of commutator-strips, or vice versa.

It is well understood that if the brushes $x$ and $y$ are in contact with those commutator-strips of R which are in a line at right angles to the line joining the field-magnetic poles F F', that a maximum current will be established through any external conductor joining $x$ and $y$. If brushes $x$ and $y$ are given a quarter-rotation in either direction, no current will be set up in a conductor joining $x$ and $y$; while if the positions of brushes $x$ and $y$ are reversed, the current established through the conductor joining $x$ and $y$ will be reversed.

Merely for convenience of illustrating the particular form of armature necessary, I have shown the Gramme armature in preference to the armature of the machine invented by Von Hefner-Alteneck, in which coils are wound upon the exterior surface of a cylinder.

I do not desire to herein broadly claim a rotating commutator-brush, nor two stationary electro-magnetic stops for arresting a commutator-brush, as such devices are fully shown and described in my application designated as "Case C." In Case C, I have described a single rotating commutator-brush and two stop-magnets, whereby pulsatory currents of one polarity may be produced and prolonged at will. My present invention relates to two rotating commutator-brushes, whereby the same commutator-brushes may be employed to produce reverse pulsatory currents or a continuous current of either polarity; nor do I in this case desire broadly to claim devices in combination with a dynamo-electric machine for establishing in the main line at pleasure of a transmitting-operator reverse pulsatory currents from a dynamo-machine, or a continuous current of the same polarity as that last sent to line, as such feature is more broadly set forth and claimed in Case A of even date herewith.

What I claim, and desire to secure by Letters Patent, is—

1. A dynamo-electric machine having an armature, substantially as described, and a series of commutator-strips in combination with two rotating commutator-brushes and means for arresting said brushes at the pleasure of the transmitting-operator.

2. A dynamo-electric machine having a rotating armature and a series of insulated commutator strips or pieces upon the shaft of said armature in combination with normally-rotating commutator-brushes and stop devices, which are interposed to arrest said rotating commutator-brushes when it is desired to print a character.

3. The combination of a dynamo-electric machine having a rotating armature, a pinion mounted upon the shaft of said armature, a sunflower-arm, a shaft provided with a pinion meshing with the pinion upon the armature-shaft, and a series of transmitting-keys and local-circuit branches connecting with the sunflower-sections.

4. The combination of the rotating commutator-brushes, as described, electro-magnetic stop devices, a series of transmitting-keys, a sunflower arrangement, and local battery, whereby the rotating commutator-brushes may be arrested in a position to establish in the main line a continuous current of either polarity.

5. The combination of the normally-rotating commutator-brushes, which are frictionally mounted upon the shaft of the armature of the dynamo-electric machine, electro-magnetic stop devices for arresting the rotating commutator-brushes, a sunflower arrangement and suitable gearing connecting the rotating commutator-brushes and the sunflower-arm.

6. The combination of the rotating commutator-brushes, provided with a rotating arm, $c$, two electro-magnetic stop devices having stop-arms L L', so arranged, substantially as described, that each of the stop-arms can arrest the rotating commutator-brushes in either of two positions.

7. The combination, substantially as described, of the rotating commutator-brushes $x$ and $y$, having a rotating arm, $c$, and the two electro-magnets M M', having stop-arms L L'.

This specification signed and witnessed this 6th day of July, 1882.

STEPHEN D. FIELD.

Witnesses:
 WM. B. VANSIZE,
 WM. ARNOUX.